United States Patent [19]

Milunas et al.

[11] Patent Number: 5,070,746
[45] Date of Patent: Dec. 10, 1991

[54] SHIFT SCHEDULING METHOD FOR CLUTCH ENERGY LIMITATION

[75] Inventors: Rimas S. Milunas, Royal Oak; Larry T. Nitz, Troy; Susan L. Rees, Clawson, all of Mich.

[73] Assignee: Saturn Corporation, Troy, Mich.

[21] Appl. No.: 601,074

[22] Filed: Oct. 23, 1990

[51] Int. Cl.$^5$ .................. B60K 41/06; F16D 23/00
[52] U.S. Cl. ........................ 74/866; 74/844; 364/424.1; 192/0.076; 192/82 T
[58] Field of Search ............ 74/844, 859, 866; 364/424.1; 192/0.076, 82 T

[56] References Cited

U.S. PATENT DOCUMENTS

| | | | |
|---|---|---|---|
| 4,567,969 | 2/1986 | Makita | 192/82 T X |
| 4,576,263 | 3/1986 | Lane et al. | 192/82 T X |
| 4,989,470 | 2/1991 | Bulgrien | 74/866 X |
| 5,025,686 | 6/1991 | Sato et al. | 74/866 |

FOREIGN PATENT DOCUMENTS 57-137724  8/1982  Japan .................. 192/82 T

Primary Examiner—Allan D. Herrmann
Assistant Examiner—Benjamin Levi
Attorney, Agent, or Firm—Mark A. Navarre

[57] ABSTRACT

An improved method of scheduling ratio shifting in a vehicle transmission adaptively adjusts the normal shift schedule to avoid shift-related overheating of the torque transmitting devices of the transmission. In normal operation, transmission shifting is scheduled by comparing measured vehicle speed and engine throttle position values with predefined load data. In the background, the transmission controller determines the cumulative thermal energy stored in the torque transmitting devices. If excessive energy is indicated, the normal shift schedule is modified to allow extended operation in the lower speed ratios. When the cumulative energy indication returns to a normal level, normal shift scheduling is resumed.

11 Claims, 10 Drawing Sheets

SHIFT SCHEDULING METHOD FOR CLUTCH ENERGY LIMITATION

This invention relates to the scheduling of shifting in a multi-speed ratio automatic transmission, and more particularly, to a method of operation which prevents energy dissipation related damage to the torque transmitting elements of the transmission.

BACKGROUND OF THE INVENTION

Ratio shifting in a vehicle transmission is generally initiated in response to the achievement of predefined load conditions represented by predefined combinations of vehicle speed and engine throttle position. In electronically controlled transmissions, data corresponding to the predefined combinations of vehicle speed and engine throttle position are stored in a look-up table or similar data structure. Measured values of vehicle speed and engine throttle position are compared to the stored data to determine the desired speed ratio, and a shift is initiated if the desired ratio is different from the actual ratio. If the desired ratio is higher than the actual ratio, an upshift is initiated; if the desired ratio is lower than the actual ratio, a downshift is initiated. In practice, separate data is maintained for upshifts and downshifts in order to provide a degree of hysteresis which avoids hunting and unnecessary heating of the transmission under steady state conditions.

The above described technique is graphically depicted for a four-speed transmission in FIG. 1c, where upshift data is represented by the solid lines 1-2, 2-3 and 3-4, and downshift data is represented by the broken lines 2-1, 3-2 and 4-3. The pairs of upshift and downshift lines divide the ranges of vehicle speed and engine throttle position into four regions corresponding to the four transmission ratios 1st, 2nd, 3rd and 4th. The separation between the respective pairs of upshift and downshift lines (3-2 and 2-3, for example) provides the hysteresis referred to above.

The transmission controller repeatedly compares measured values of vehicle speed and engine throttle position with ratio-dependent data from the table to determine the desired ratio. If the actual ratio is 1st, the measured vehicle speed and engine throttle position values are compared with the 1-2 upshift line; if the actual ratio is 2nd, the measured values are compared with the 2-1 downshift line and the 2-3 upshift line; if the actual ratio is 3rd, the measured values are compared with the 3-2 downshift line and the 3-4 upshift line; and if the actual ratio is 4th, the measured values are compared with the 4-3 downshift line.

Shifting the transmission from one speed ratio to another is achieved by engaging and disengaging various fluid operated torque transmitting devices (referred to herein as clutches) within the transmission. During the course of each such shift, a certain amount of friction-related heat is generated and absorbed by the torque transmitting devices involved in the shift. The heat is slowly dissipated into the transmission fluid and housing, and the various clutches are sized to withstand the heat of shifting which would occur in normal driving conditions. Under unusual or abusive driving conditions, however, the frequency of shifting may significantly exceed the normal expectation, thereby thermally stressing the transmission clutches.

SUMMARY OF THE PRESENT INVENTION

The present invention is directed to an improved method of scheduling ratio shifting in a vehicle transmission, where the normal schedule is adaptively adjusted to avoid shift-related overheating of the torque transmitting devices of the transmission. In normal operation, transmission shifting is scheduled by comparing measured vehicle speed and engine throttle position values with predefined load data substantially as described above in reference to FIG. 1c. In the background, the transmission controller determines the cumulative thermal energy stored in the various clutches. If excessive energy is indicated, the normal upshift schedule is modified to allow extended operation in the lower speed ratios. When the cumulative energy indication returns to a normal level, normal upshift scheduling is resumed.

The cumulative energy indication is increased by a calculated amount during each upshift, downshift and canceled shift, and is periodically decreased by a computed amount during nonshifting operation. The calculated increases take into account the energy imparted to the respective clutches during the slipping portion of each shift, based on the transmission input speed and torque and the shift time. In upshifts, the calculated amount is applied to the engaging or on-coming clutch; in downshifts and canceled shifts, the calculated amount is applied to the disengaging or off-going clutch. The calculated decrease takes into account the transmission input speed and the engine throttle position.

The shift schedule modification is carried out according to this invention by developing an offset for one of the measured parameters (engine throttle position or vehicle speed) in relation to the cumulative energy indications. In the illustrated embodiments, the offset is applied to the measured engine throttle position. According to a first embodiment of this invention, the cumulative energy indications for two or more clutches are combined to detect an excessive energy condition, and the upshift schedule for each shift which involves such clutches is modified to extend operation in the lower ratio as described above. According to a second embodiment of this invention, cumulative energy indications for individual clutches are separately maintained to detect an excessive energy condition, and the upshift schedule for shifts involving the overheated clutches is modified. In either event, the amount of modification is variable, depending on the magnitude of the respective energy indications.

In operation, the method of the present invention thus prevents heat-related damage to the clutches of the transmission by limiting the amount of shifting which would otherwise occur. When the vehicle is operated on a grade, for example, successive load-related shifting will cause the cumulative energy indication(s) to rise above a threshold indicative of excessive heat energy. This, in turn, will result in an upshift schedule modification which extends operation in a lower ratio, effectively inhibiting normal upshifting until the heat is sufficiently dissipated or the load condition is alleviated.

BRIEF DESCRIPTION OF THE DRAWINGS

FIG. 1c graphically depicts the shift scheduling technique normally employed by the control unit of FIG. 1a.

FIG. 2 is specific to the first embodiment of this invention, while FIG. 2a is specific to the second embodiment of this invention.

FIGS. 4 and 9 are specific to the first embodiment of this invention, while FIGS. 4a and 9a are specific to the second embodiment of this invention.

DETAILED DESCRIPTION OF THE DRAWINGS

Figure 1A:
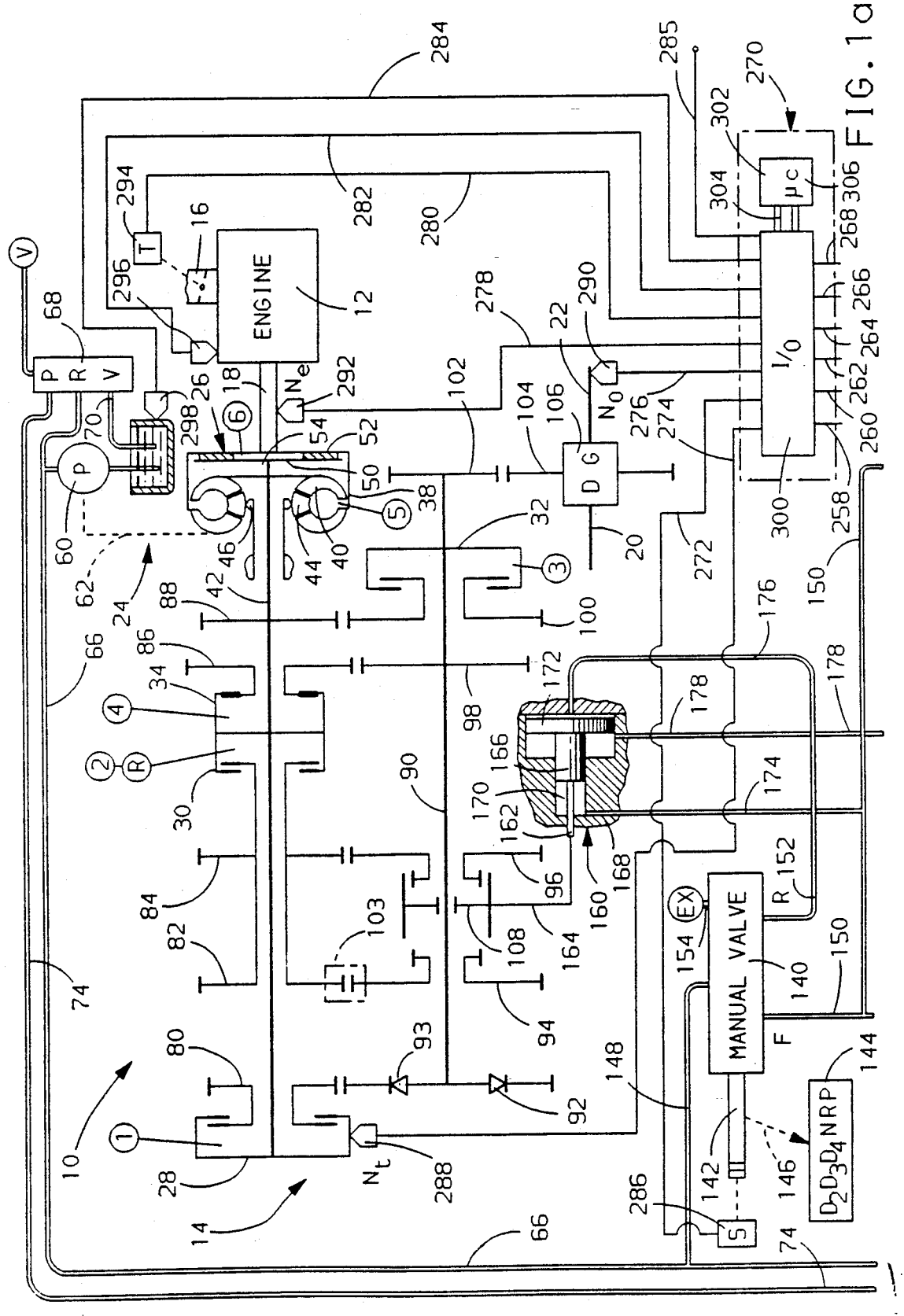
FIGS. 1a–1b schematically depict a computer-based electronic transmission control system controlled according to this invention.
Figure 1B:
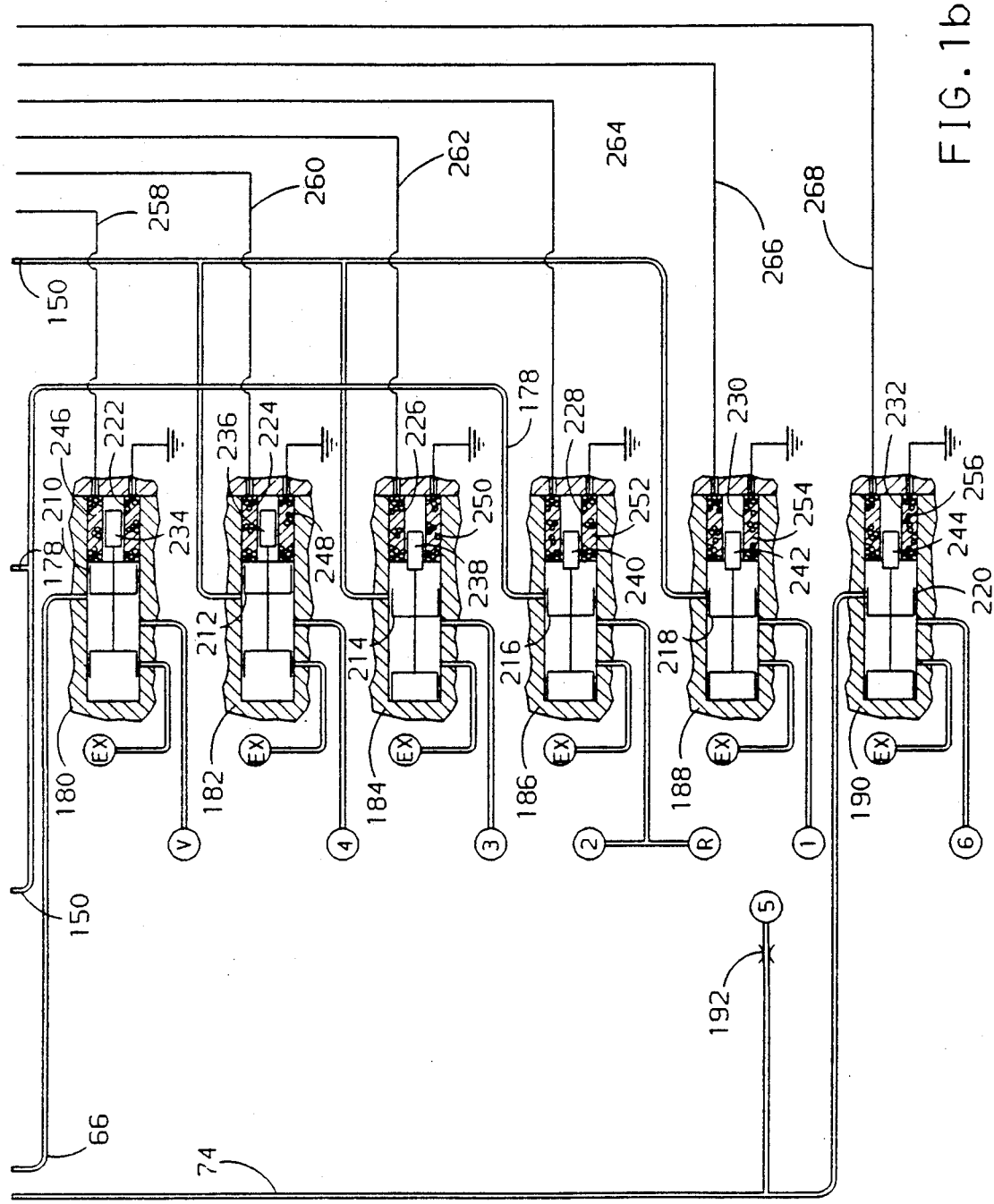

Referring particularly to FIGS. 1a and 1b, the reference numeral 10 generally designates a motor vehicle drivetrain including an engine 12 and a parallel shaft transmission 14 having a reverse speed ratio and four forward speed ratios. Engine 12 includes a throttle mechanism 16 mechanically connected to an operator manipulated device such as an accelerator pedal (not shown) for regulating engine output torque, such torque being applied to the transmission 14 through the engine output shaft 18. The transmission 14 transmits engine output torque to a pair of drive axles 20 and 22 through a torque converter 24 and one or more of the fluid operated clutches 26-34, such clutches being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14. The torque converter 24 also includes a clutch 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56. When the fluid pressure in the apply chamber 54 exceeds that in the release chamber 56, the friction surface 52 of clutch plate 50 is moved into engagement with the input shell 38 as shown in FIG. 1, thereby engaging the clutch 26 to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36 as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the Schuster U.S. Pat. No. 4,342,545 issued Aug. 3, 1982, and a representative pressure regulator valve is disclosed in the Vukovich U.S. Pat. No. 4,283,970 issued Aug. 18, 1981.

The transmission shaft 42 and a further transmission shaft 90 each have a plurality of gear elements rotatably supported thereon. The gear elements 80-88 are supported on shaft 42 and the gear elements 92-102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutches 28-34 each comprise an input member rigidly connected to a transmission shaft 42 or 90, and an output member rigidly connected to one or more gear elements such that engagement of a clutch couples the respective gear element and shaft to effect a driving connection between the shafts 42 and 90. The clutch 28 couples the shaft 42 to the gear element 80; the clutch 30 couples the shaft 42 to the gear elements 82 and 84; the clutch 32 couples the shaft 90 to the gear element 100; and the clutch 34 couples the shaft 42 to the gear element 86. Each of the clutches 28-34 is biased toward a disengaged state by a return spring (not shown). Engagement of the clutch is effected by supplying fluid pressure to an apply chamber thereof. The resulting torque capacity of the clutch is a function of the applied pressure less the return spring pressure, hereinafter referred to as the working pressure pressure. The circled numeral 1 represents a fluid passage for supplying pressurized fluid to the apply chamber of clutch 28; the circled numeral 2 and letter R represent a fluid passage for supplying pressurized fluid to the apply chamber of the clutch 30; the circled numeral 3 represents a fluid passage for supplying pressurized fluid to the apply chamber of the clutch 32; and the circled numeral 4 represents a fluid passage for directing pressurized fluid to the apply chamber of the clutch 34.

The various gear elements 80-88 and 92-100 are relatively sized such that engagement of first, second, third and fourth forward speed ratios are effected by engaging the clutches 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutches 28-34 in a released condition. The speed ratios defined by the various gear element pairs are generally characterized by the ratio of the turbine speed Nt to output speed No. Representative Nt/No ratios for transmission 14 are as follows:

| First | 2.368 | Second | 1.273 |
|---|---|---|---|
| Third | 0.808 | Fourth | 0.585 |
| Reverse | 1.880 | | |

Shifting from a current forward speed ratio to a desired forward speed ratio requires that the clutch associated with the current speed ratio (off-going) be disengaged and the clutch associated with the desired speed ratio (on-coming) be engaged. For example, a shift from the first forward speed ratio to the second forward speed ratio involves disengagement of the clutch 28 and engagement of the clutch 30. As explained below, the shifting between the various speed ratios is initiated in response to the achievement of predefined load conditions represented by predefined combinations of vehicle speed and engine throttle position. Data corresponding to the predefined combinations of vehicle speed and engine throttle position are stored in a look-up table or similar data structure, as described above in reference to FIG. 1c, and measured values of vehicle speed and engine throttle position are compared to the stored data to determine the desired speed ratio. If the desired ratio is higher than the actual ratio, an upshift is initiated; if the desired ratio is lower than the actual ratio, a downshift is initiated. In any event, the shifting is carried out by a precise control of the fluid pressure supplied to the various clutches 28-34, as described for example, in the U.S. Pat. Nos. 4,707,789 and 4,653,350 to Downs et al, issued on Nov. 17, 1987 and Mar. 31, 1987, respectively.

The fluid control elements of the transmission 14 include a manual valve 140, a directional servo 160 and a plurality of electrically operated fluid valves 180-190. The manual valve 140 operates in response to operator demand and serves, in conjunction with directional servo 160, to direct regulated line pressure to the appropriate fluid valves 182-188. The fluid valves 182-188, in turn, are individually controlled to direct fluid pressure to the clutches 28-34. The fluid valve 180 is controlled to direct fluid pressure from the pump output line 66 to the pressure regulator valve 68, and the fluid valve 190 is controlled to direct fluid pressure from the line 74 to the clutch 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148 and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3 or D2 positions shown on the indicator mechanism 144, line pressure from the line 148 is directed to the forward (F) output line 150. When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the second or reverse speed ratio is not effected until engagement of the clutch 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180-190 each receive fluid pressure at an input passage thereof from the pump 60, and are individually controlled to direct fluid pressure to the pressure regulator valve 68 or respective clutches 26-34. The fluid valve 180 receives line pressure directly from pump output line 66, and is controlled to direct a variable amount of such pressure to the pressure regulator valve 68 as indicated by the circled letter V. The fluid valves 182, 186 and 188 receive fluid pressure from the forward output line 150 of manual valve 140, and are controlled to direct variable amounts of such pressure to the clutches 34, 32 and 28 as indicated by the circled numerals 4, 3 and 1, respectively. The fluid valve 186 receives fluid pressure from the forward output line 150 and the directional servo output line 178, and is controlled to direct a variable amount of such pressure to the clutch 30 as indicated by the circled numeral 2 and the circled letter R. The fluid valve 190 receives fluid pressure from line 74 of pressure regulator valve 68, and is controlled to direct a variable amount of such pressure to the release chamber 56 of the clutch 26 as indicated by the circled numeral 6. The apply chamber 54 of the clutch 26 is supplied with fluid pressure from the output line 74 via the orifice 192 as indicated by the circled numeral 5.

Each of the fluid valves 180–190 includes a spool element 210–220, axially movable within the respective valve body for directing fluid flow between input and output passages. When a respective spool element 210–220 is in the rightmost position as viewed in FIG. 1, the input and output passages are connected. Each of the fluid valves 180–190 includes an exhaust passage as indicated by the circled letters EX, such passage serving to drain fluid from the respective clutch when the spool element is shifted to the leftmost position as viewed in FIG. 1. In FIG. 1, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180–190 includes a solenoid 222–232 for controlling the position of its spool element 210–220. Each such solenoid 222–232 comprises a plunger 234–244 connected to the respective spool element 210–220 and a solenoid coil 246–256 surrounding the respective plunger. One terminal of each such solenoid coil 246–256 is connected to ground potential as shown, and the other terminal is connected to an output line 258–268 of a control unit 270 which governs the solenoid coil energization. As set forth hereinafter, the control unit 270 pulse-width-modulates the solenoid coils 246–256 according to a predetermined control algorithm to regulate the fluid pressure supplied to the pressure regulator 68 and the clutches 26–34, the duty cycle of such modulation being determined in relation to the desired magnitude of the supplied pressures.

Input signals for the control unit 270 are provided on the input lines 272–285. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276, and 278, respectively. The speed transducer 288 senses the velocity of the transmission shaft 42 and therefore the turbine or transmission input speed Nt; the speed transducer 290 senses the velocity of the drive axle 22 and therefore the transmission output speed No; and the speed transducer 292 senses the velocity of the engine output shaft 18 and therefore the engine speed Ne. The position transducer (T) 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284. A shift mode selection switch 299 mounted on the vehicle instrument panel (not shown) provides an input on line 285 indicating the driver's selection of the Normal or Performance shift modes.

The control unit 270 responds to the input signals on input lines 272–285 according to a predetermined control algorithm as set forth herein, for controlling the energization of the fluid valve solenoid coils 246–256 via output lines 258–268. As such, the control unit 270 includes an input/output (I/0) device 300 for receiving the input signals and outputting the various pulse-width-modulation signals, and a microcomputer 302 which communicates with the I/0 device 300 via an address-and-control bus 304 and a bi-directional data bus 306.

As indicated above, the present invention is directed to an improved method of scheduling ratio shifting so as to avoid damage to the transmission clutches due to shift-related heat build-up. In the illustrated embodiment, however, the control unit 270 only maintains cumulative energy indications for the clutches 32 and 34. The 3rd clutch 32 is affected by 2-3 upshifts and 3-2 downshifts; the 4th clutch 34 is affected by 3-4 upshifts and 4-3 downshifts.

In the case of downshifts, the energy due to the shift is computed according to the product of the change dNt in turbine speed, a transmission input torque variable Tv and a gain factor G2 or G3 depending on the shift mode. In the case of upshifts, the energy due to the shift is computed according to the product of the change dNt in turbine speed, a transmission input torque variable Tv, the preshift turbine speed factor Nt(PS) and a gain factor G1. The preshift turbine speed factor is used to achieve a faster response in the case of high speed shifting. Canceled 3-2 downshifts add a fixed amount of energy K1 to 3rd clutch 32, and canceled 4-3 downshifts add a fixed amount of energy K1 to the 4th clutch 34. In each case, the accumulated energy indication is periodically reduced during nonshifting operation by an energy reduction factor (ERF) determined in relation to the sum of the turbine speed Nt and the engine throttle position (TPS).

Figure 2:
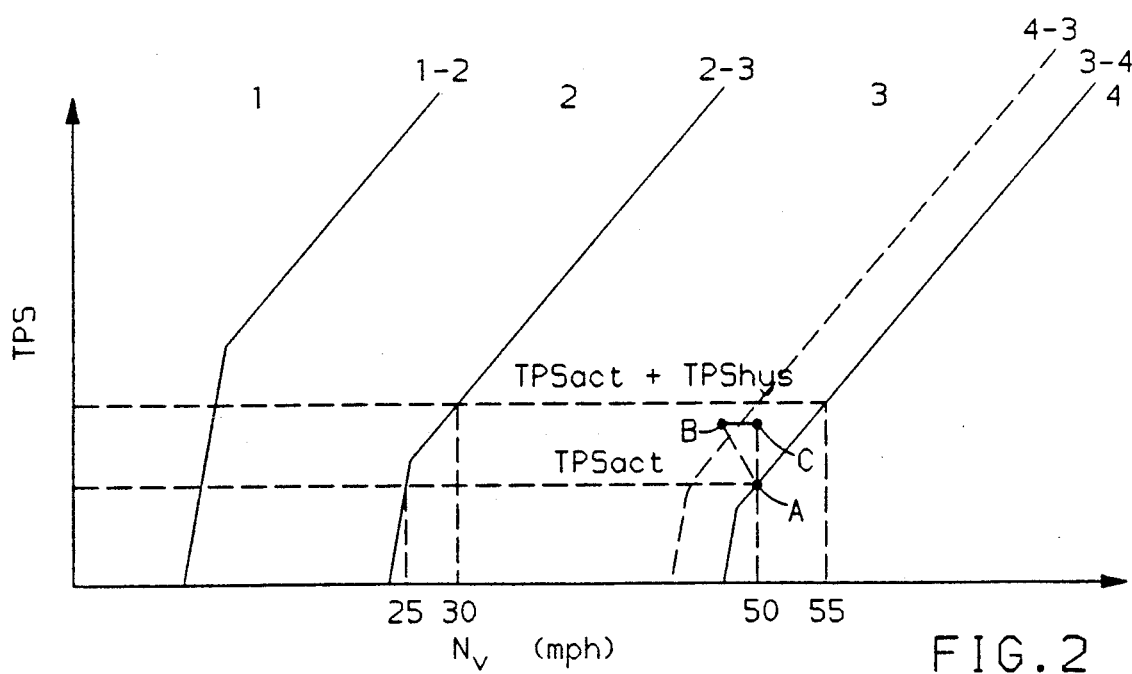
FIGS. 2, 2a and 3 graphically depict the shift schedule modification of the present invention.
Figure 3:
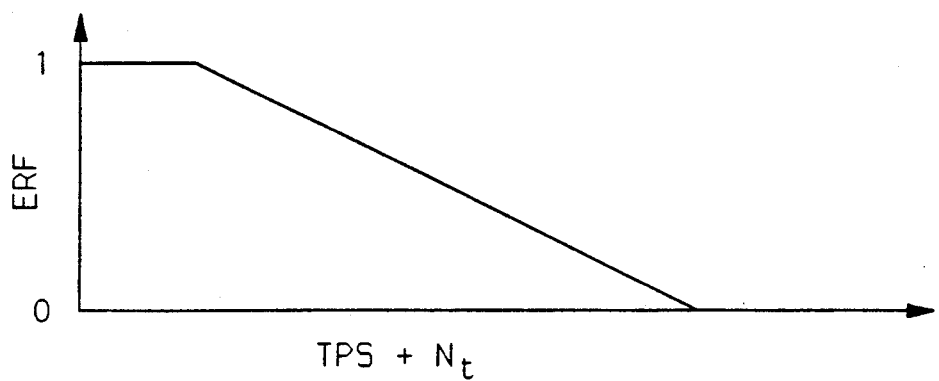

According to a first embodiment of this invention represented by the graphs of FIGS. 2 and 3, and the flow charts of FIGS. 4, 5, 6, 7, 8 and 9, the cumulative energy indications for the 3rd and 4th clutches 32 and 34 are summed and compared to an energy threshold to determine the presence of excessive heating. If the summed energy indication exceeds the threshold, the control unit 270 computes an engine throttle position offset TPShys in relation to the amount by which the summed energy indication exceeds the threshold. The offset is then applied to the measured engine throttle position TPS for use in determining if upshifting is appropriate.

Figure 1C:
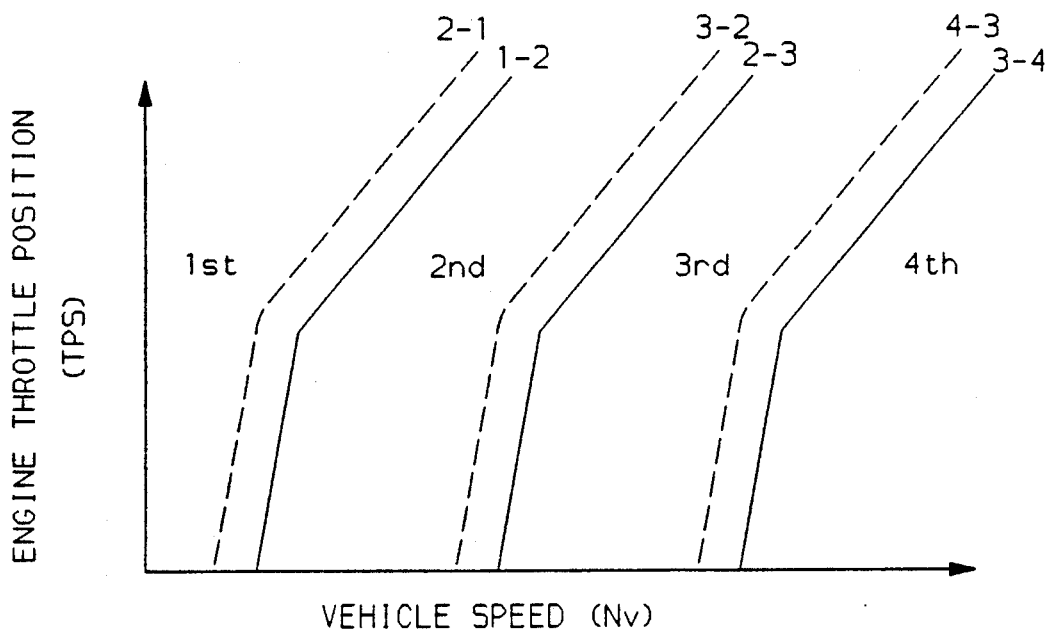

The use of measured and offset values of engine throttle position for upshift scheduling according to the first embodiment of this invention is graphically depicted in FIG. 2, where the 1-2, 2-3 and 3-4 upshift lines correspond to those depicted in FIG. 1c. In normal operation, the actual engine throttle position value TPSact is used to determine if upshifting is desired. If the 2nd ratio is engaged, a 2-3 upshift will be initiated at a vehicle speed of about 25 MPH for the indicated throttle position TPSact. Similarly, if the 3rd ratio is engaged, a 3-4 upshift will occur at a vehicle speed of about 50 MPH. Under conditions of excessive heating, however, the sum of the measured throttle position and the offset (TPSact+TPShys) is used to determine if upshifting is desired. Here, if the 2nd ratio is engaged, the 2-3 upshift will not be initiated until the vehicle speed reaches 30 MPH for the same actual throttle setting; and if the 3rd ratio is engaged, the 3-4 upshift will not be initiated until the vehicle speed reaches 55 MPH.

Since downshifting occurs at the normal load condition, the shift schedule modification has the effect of variably increasing the hysteresis among the 2nd, 3rd and 4th speed ratios. The shift schedule modification never triggers a downshift since the offset does not affect the downshift determination, but once a downshift does occur, subsequent upshifting is delayed until (1) the overheating is alleviated or (2) there is a significant reduction in the engine throttle position. As a result, operation in the lower speed ratio is effectively extended to prevent further increases in the shift-related energy imparted to clutches 32 and 34.

By way of example in reference to FIG. 2, suppose that a vehicle controlled according to the first embodiment of this invention encounters a long steep grade while maintaining a constant cruising speed of 50 MPH in 4th gear. The initial operating point is represented by the point A. As the vehicle loses speed, the operator (or vehicle cruise control system) attempts to return to the desired speed setting by increasing the engine throttle position, causing the TPS vs. Nv operating point to follow the trace AB. At point B, a 4-3 downshift is initiated, and the increased power output is sufficient to return the vehicle speed to the desired setting along the trace BC. The operator then decreases the engine throttle setting so as to not overshoot the desired speed setting, along the trace CA, producing a 3-4 upshift at point A. This is the hysteresis provided by the normal shift scheduling method.

If the grade continues, the successive 3-4 upshifts and 4-3 downshifts of the above example will produce a significant net increase in the heat stored in the 4th clutch 34. When the sum of the 3rd and 4th clutch cumulative energy indications exceeds the energy threshold, the upshifts will be determined on the basis of (TPSact+TPShys) instead of just TPSact. As a result, the 3-4 upshift will not occur unless the vehicle speed reaches 55 MPH, effectively extending the normal shift pattern hysteresis. In the example, the vehicle will remain in 3rd gear at the desired speed setting of 50 MPH until the summed cumulative energy indications fall below the energy threshold. The corrective action occurs regardless of grade so as to protect the transmission clutches 32 and 34 in the event that the throttle setting is intentionally positioned to cause repeated shifting.

Figure 2A:
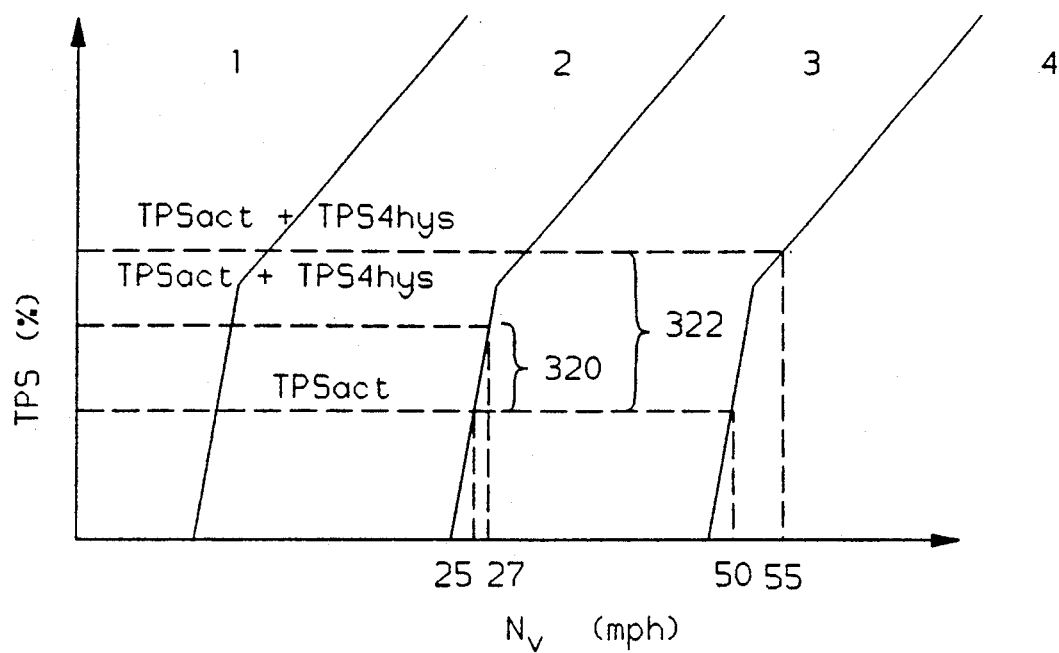

According to the second embodiment of this invention represented by the graphs of FIGS. 2a and 3, and the flow charts of FIGS. 4a, 5, 6, 7, 8 and 9a, the cumulative energy indications for the 3rd and 4th clutches 32 and 34 are maintained separate and are individually compared to an energy threshold to determine the presence of excessive heating. In this way, the offsets for clutches 32 and 34 can be independently determined. If the offset for the 4th clutch 34 is greater than the offset for the 3rd clutch 32 (as would occur in the above described example), the 3rd clutch offset is used to schedule 2-3 upshifts and the 4th clutch offset is used to schedule 3-4 upshifts. If the offset for the 3rd clutch 32 is greater than the offset for the 4th clutch 34 (as would occur in repeated 2-3 upshifting and 3-2 downshifting), the 3rd clutch offset is used to schedule both 2-3 upshifts and 3-4 upshifts so as to maintain the separation of the 2-3 and 3-4 upshifts.

Thus, the second embodiment method of this invention has the effect of limiting the shift schedule modification to the 4th clutch in the event of a shift cycle which does not appreciably affect the 3rd clutch 32. This occurs in the example described above where there is multiple successive shifting between 3rd and 4th ratios. In this case, the 4th clutch 34 is the on-coming clutch for the 3-4 upshift and the off-going clutch for the 4-3 downshift; the 3rd clutch 32 receives only slightly higher than normal heating. This condition is graphically depicted in FIG. 2a, where the offset for the 3rd clutch 32 is represented by the quantity 320; and the offset for the 4th clutch 34 is represented by the larger quantity 322. As a result, 2-3 upshifts at the indicated actual engine throttle setting are only extended from 25 MPH to 27 MPH, while 3-4 upshifts are extended from 50 MPH to 55 MPH.

FIG. 3 depicts the energy reduction factor (ERF) which is deducted from the cumulative energy indications in nonshifting operation to reflect the dissipation of thermal energy from the clutches into the transmission fluid and housing. In the illustrated embodiment, the energy indications are decremented by the value of ERF in each nonshifting loop of the flow diagram. The value of ERF is inversely related to the sum of the throttle position TPS and the turbine speed Nt as indicated in FIG. 3. As such, the maximal reduction occurs under low speed, low throttle conditions when high energy shifting is not likely to soon recur. Conversely, minimal energy reductions occur under conditions of high speed and high throttle in order to maintain the increased hysteresis in anticipation of further high energy shifting.

Figure 4:
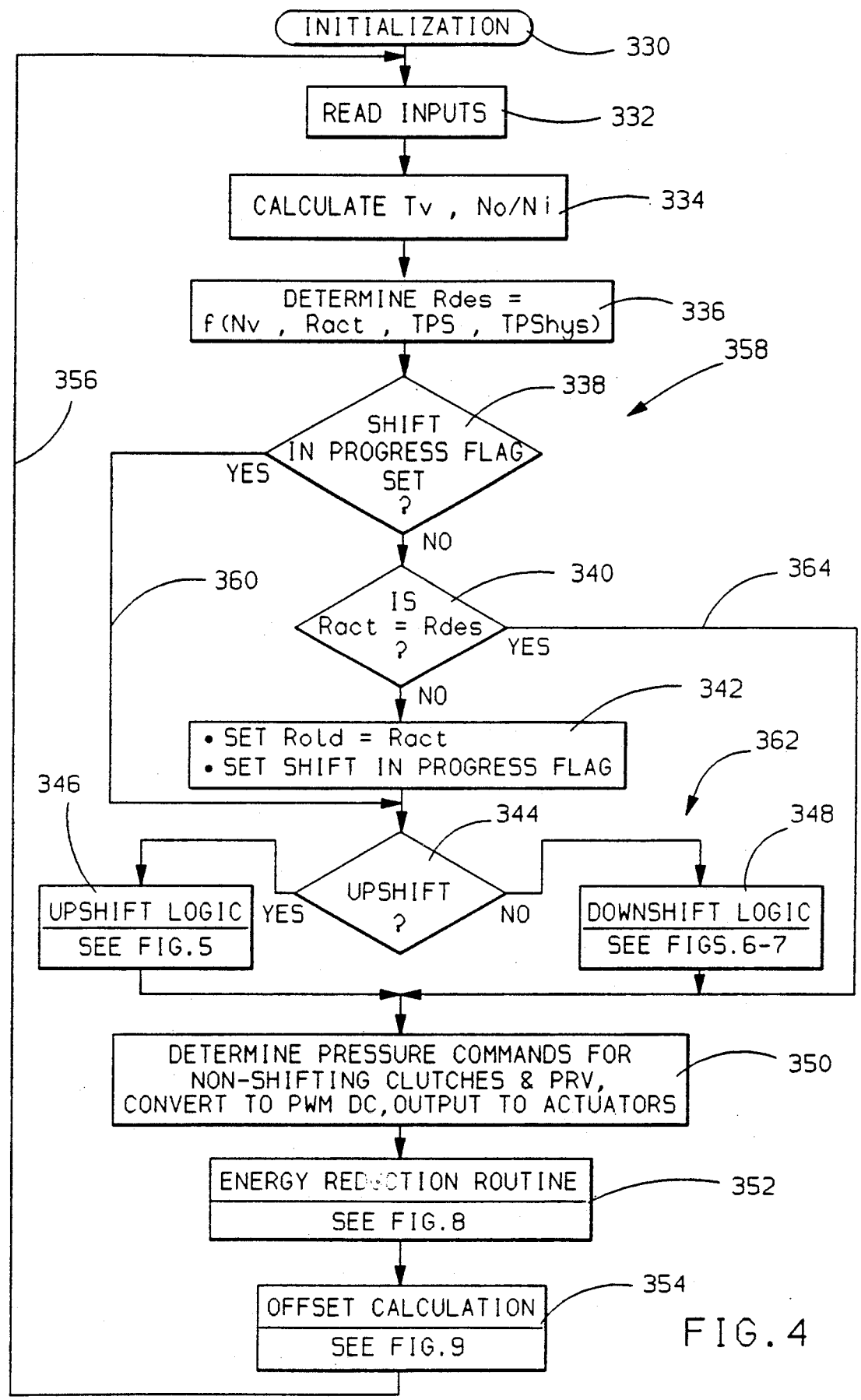
FIGS. 4, 4a, 5, 6, 7, 8, 9 and 9a depict flow diagrams executed by the computer-based controller of FIG. 1a in carrying out the control of this invention.
Figure 4A:
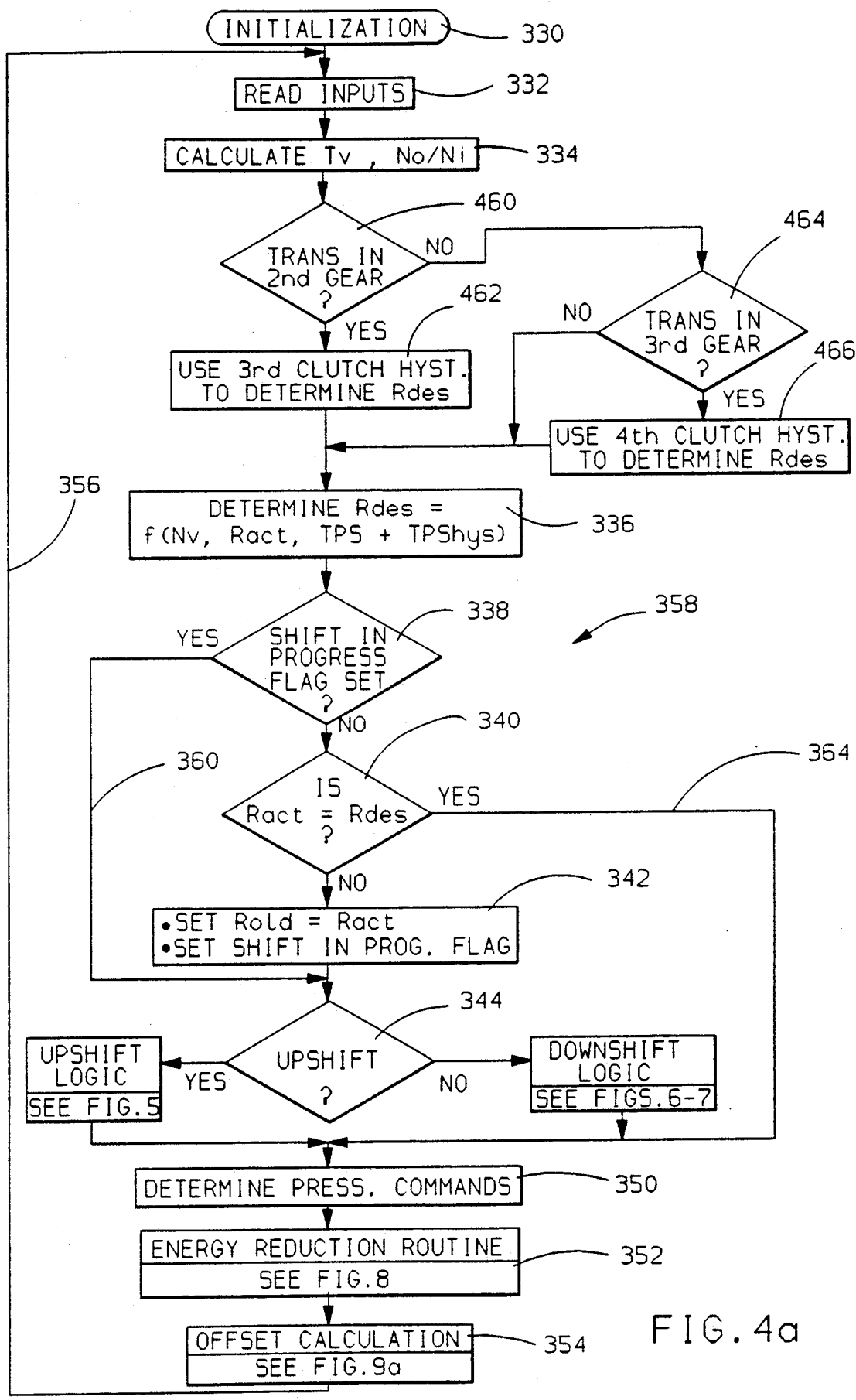
Figure 9:
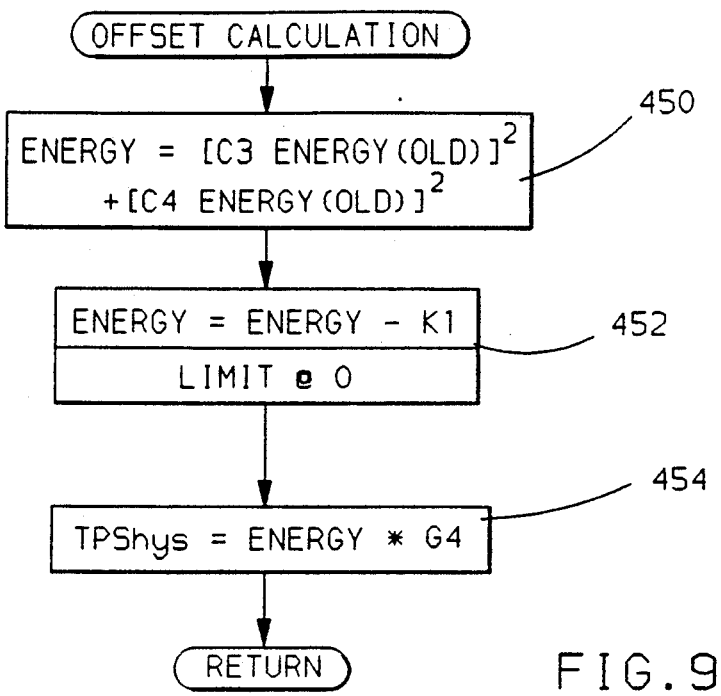
Figure 9A:
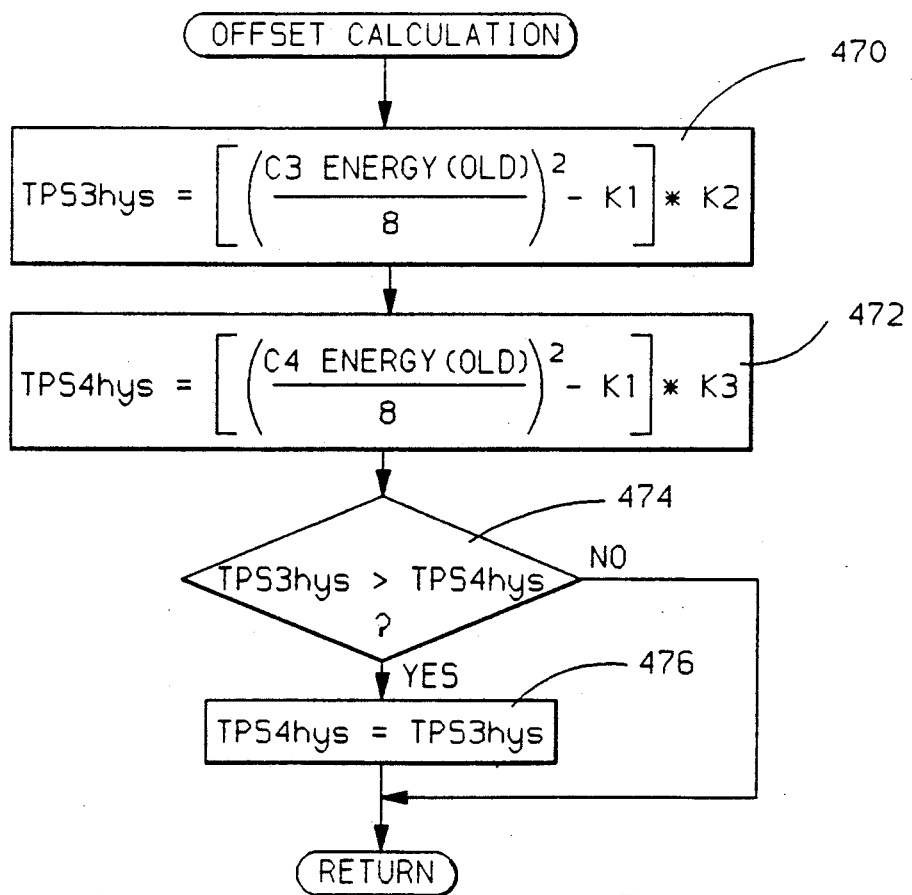

The flow diagrams of FIGS. 4, 4a, 5, 6, 7, 8, 9 and 9a, represent program instructions to be executed by the microcomputer 302 of control unit 270 in mechanizing ratio shifting and the adaptive control functions of this invention. The flow diagram of FIGS. 4/4a represent a main or executive program which calls various subroutines for executing particular control functions as necessary. The flow diagrams of FIGS. 5-9 represent the functions performed by those subroutines which are pertinent to the present invention. FIGS. 4 and 9 are specific to the first embodiment, while FIGS. 4a and 9a are specific to the second embodiment.

Referring to the first embodiment main loop program of FIG. 4, the reference numeral 330 designates a set of program instructions executed at the initiation of each period of vehicle operation for initializing the various tables, timers, etc. used in carrying out the control functions of this invention. Following such initialization, the instruction blocks 332-354 are repeatedly executed in sequence as designated by the flow diagram lines connecting such instruction blocks and the return line 356. Instruction block 332 reads and conditions the various input signals applied to I/O device 300 via the lines 272-285, and updates (increments) the various control unit timers. Instruction block 334 calculates various terms used in the control algorithms, including the input torque Ti, the torque variable Tv and the speed ratio No/Ni. A description of a computation for the torque variable Tv is set forth in the above-referenced patents to Downs et al. Instruction block 336 determines the desired speed ratio, Rdes, in accordance with a number of inputs including present ratio Ract, throttle position TPS, vehicle speed Nv, manual valve position, and the clutch energy offset TPShys, if any. In transmission control, this function is generally referred to as shift pattern generation.

The blocks designated by the reference numeral 358 include the decision block 338 for determining if a shift is in progress as indicated by the "SHIFT IN PROGRESS" flag; the decision block 340 for determining if the actual speed ratio Ract (that is, No/Nt) is equal to the desired speed ratio Rdes determined at instruction block 336; and the instruction block 342 for setting up the initial conditions for a ratio shift. The instruction block 342 is only executed when decision blocks 338 and 340 are both answered in the negative. In such case, instruction block 342 serves to set the old ratio variable, Rold, equal to Ract, to set the "SHIFT IN PROGRESS" flag, clear the shift timers, and to calculate the fill time tfill for the on-coming clutching device. If a shift is in progress, the execution of blocks 340 and 342 is skipped, as indicated by the flow diagram line 360. If no shift is in progress, and the actual ratio equals the desired ratio, the execution of instruction block 342 and the blocks designated by the reference numeral 362 is skipped, as indicated by the flow diagram line 364.

The blocks designated by the reference numeral 362 include the decision block 344 for determining if the shift is an upshift or a downshift; the instruction block 346 for developing pressure commands for the on-coming and off-going clutches if the shift is an upshift; and the instruction block 348 for developing the pressure commands for the on-coming and off-going clutches if the shift is a downshift. As indicated in the Figure, the Upshift Logic is further detailed in the flow diagram of FIG. 5, and the Downshift Logic is further detailed in the flow diagrams of FIGS. 6 and 7. As explained below, the shift logic blocks 346 and 348 also include energy logging routines for developing the cumulative energy indications for the clutches 32 and 34.

Instruction block 350 determines pressure commands for the PRV and the nonshifting clutches, converts the commands to a PWM duty cycle based on the operating characteristics of the various actuators, and energizes the actuator coils accordingly. Instruction block 352 is then executed to determine the energy reduction factor ERF, and decrement the cumulative energy indications, as explained more fully in the flow diagram of FIG. 8. Finally, the instruction block 354 is executed to calculate the clutch energy-related offset TPShys, if any, to be applied in subsequent determinations of the desired speed ratio, as explained more fully in the flow diagram of FIG. 9.

Figure 5:
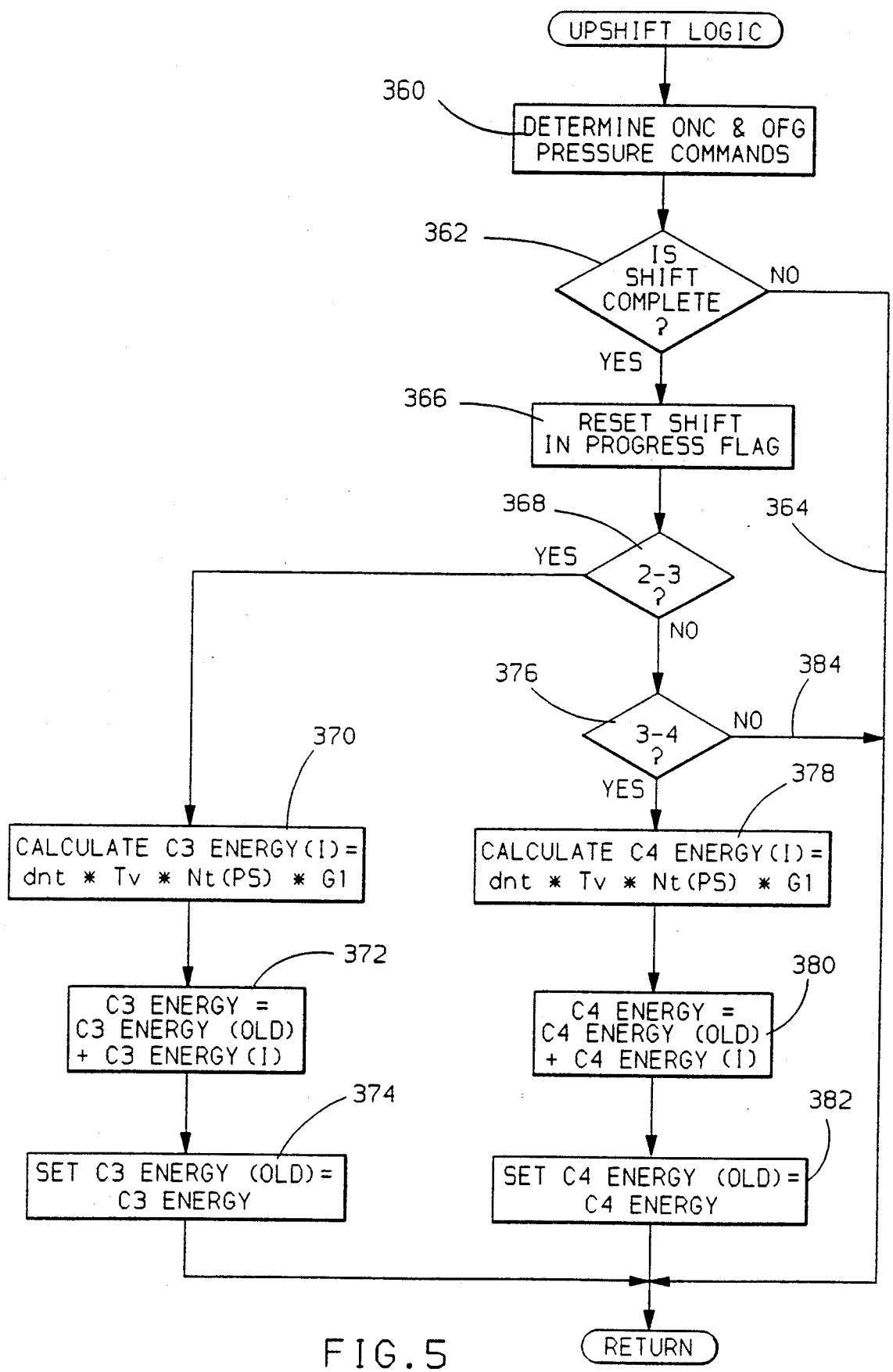

Referring to the Upshift Logic of FIG. 5, the reference numeral 360 is first executed to determine the on-coming (ONC) and off-going (OFG) pressure commands for the upshift. Representative routines for computing such pressure commands are detailed in the above-referenced patents to Downs et al. Until the shift is complete, as determined by decision block 362, the remainder of the routine is skipped, as indicated by the flow diagram line 364. Upon completion of the shift, the instruction block 366 is executed to reset the Shift In Progress flag. If the shift is a 2-3 upshift, as determined by decision block 368, the instruction blocks 370-374 are executed to calculate the incremental energy C3 ENERGY(I) added to the 3rd clutch 32, to update the cumulative energy indication C3 ENERGY for clutch 32, and to store the cumulative indication in the term C3 ENERGY(OLD). If the shift is a 3-4 upshift, as determined by decision block 376, the instruction blocks 378-382 are executed to calculate the incremental energy C4 ENERGY(I) added to the 4th clutch 34, to update the cumulative energy indication C4 ENERGY for clutch 34, and to store the cumulative indication in the term C4 ENERGY(OLD). If the shift is a 1-2 upshift, no energy logging is performed, as indicated by the flow diagram line 384.

Figure 6:
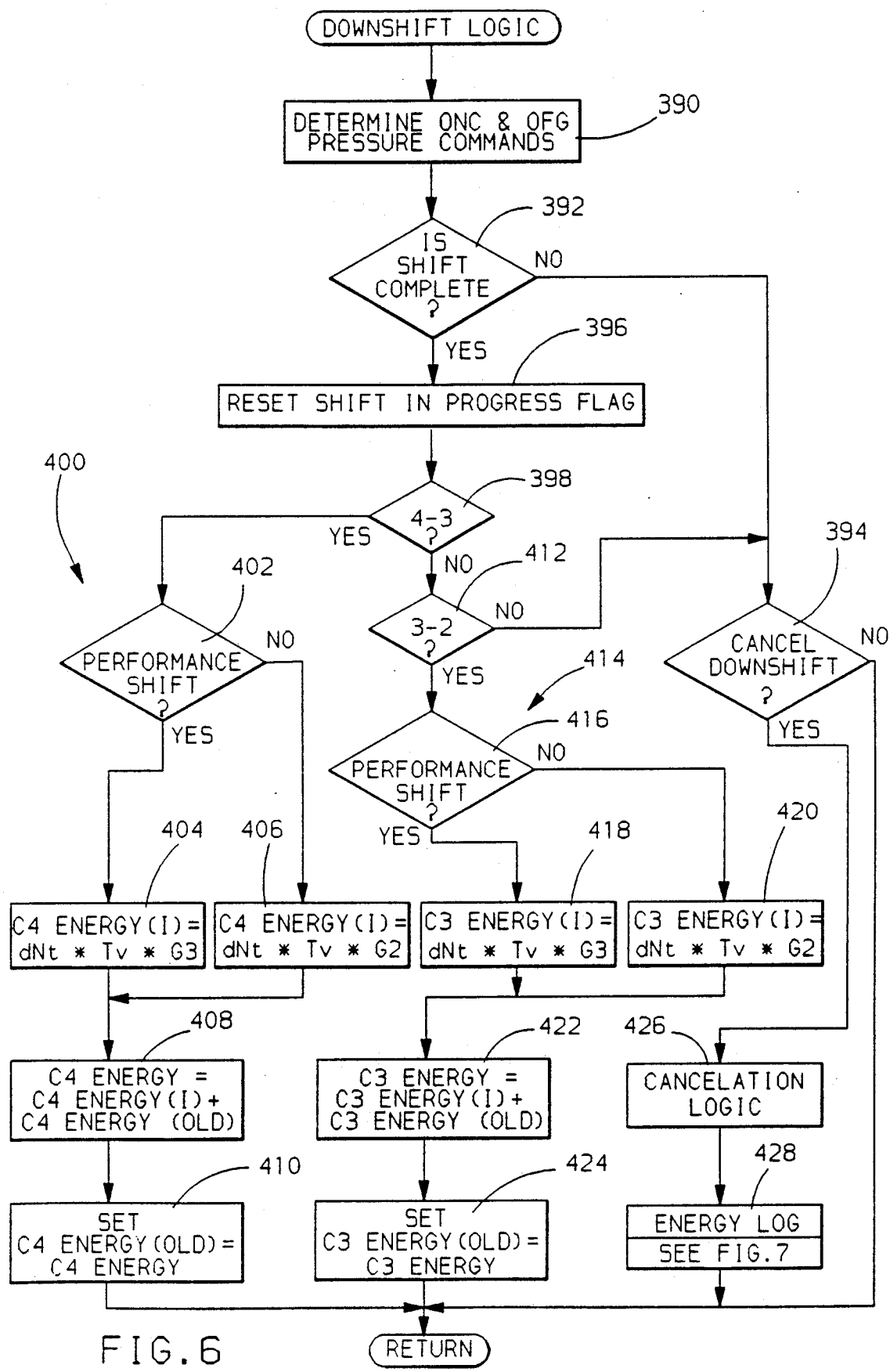
Figure 7:
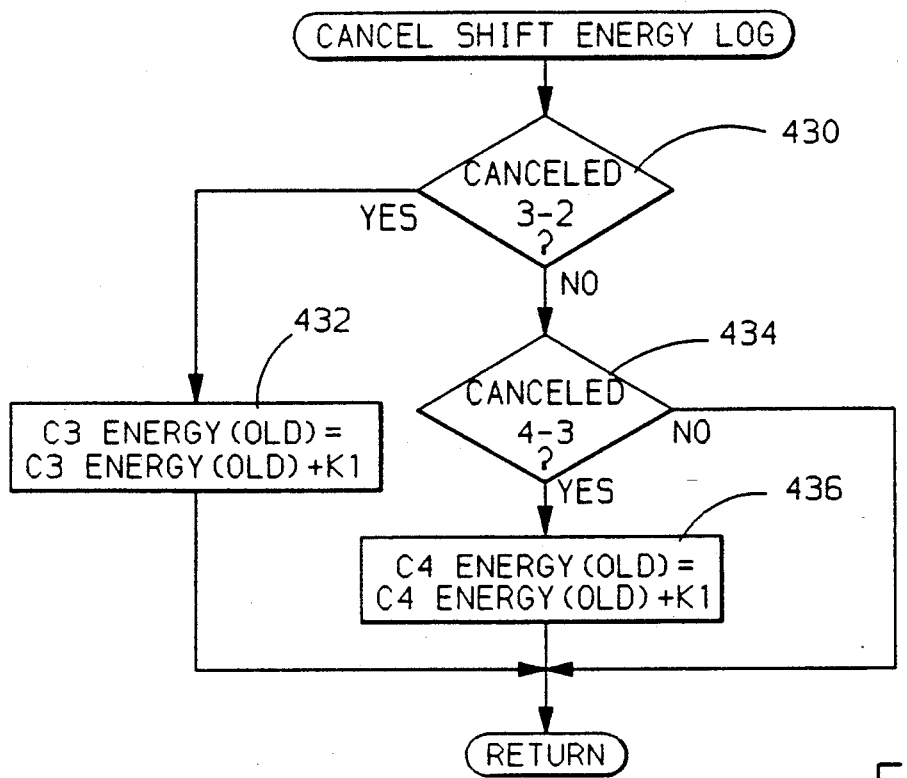
Figure 8:
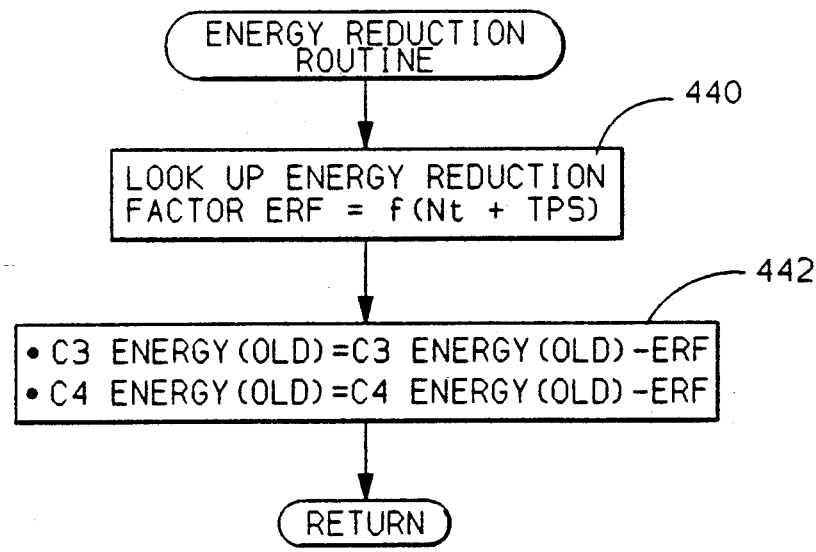

Referring to the Downshift Logic of FIGS. 6 and 7, the reference numeral 390 is first executed to determine the on-coming (ONC) and off-going (OFG) pressure commands for the downshift. Representative routines for computing such pressure commands are detailed in the above-referenced patents to Downs et al. Until the shift is complete, as determined by decision block 392, the energy logging routines are skipped, and the decision block 394 is executed to determine if shift cancellation is appropriate.

Upon completion of the shift, the instruction block 396 is executed to reset the Shift In Progress flag. If the shift is a 4-3 downshift, as determined by decision block 398, the flow diagram branch 400 is executed to log the incremental energy C4 ENERGY(I) of the 4th clutch 34. Different gain factors G2, G3 are used depending on the shift mode (i.e., Normal or Performance), as indicated by the blocks 402-406, since the energy imparted to the clutch 34 is mode-dependent. Once the incremental energy is computed, the instruction blocks 408-410 are executed to update the cumulative energy indication for clutch 34, and to store the cumulative indication in the term C4 ENERGY(OLD). If the shift is a 3-2 downshift, as determined by decision block 412, the flow diagram branch 414 is executed to log the incremental energy C3 ENERGY(I) of the 3rd clutch 32. Again, different gain factors G2, G3 are used depending on the shift mode, as indicated by the blocks 416-420. Once the incremental energy is computed, the instruction blocks 422-424 are executed to update the cumulative energy indication for clutch 32, and to store the cumulative indication in the term C3 ENERGY(OLD).

If the shift is a 2-1 downshift, no energy logging is performed, and the decision block 394 is executed to determine if shift cancellation is appropriate. This can occur, for example, if the driver of the vehicle releases the accelerator pedal in the course of a power-on downshift. In this case, instruction block 426 is executed to cancel the downshift and reschedule an upshift to the former ratio. In this process, the off-going clutch of the downshift is the same as the on-coming clutch of the upshift, and the instruction block 428 is executed to add the incremental energy to the appropriate term C3 ENERGY(OLD) or C4 ENERGY(OLD). Referring to FIG. 7, if a 3-2 downshift is canceled, as determined by decision block 430, the instruction block 432 is executed to increment the 3rd clutch energy indication by a fixed amount K1. If a 4-3 downshift is canceled, as determined by decision block 434, the instruction block 436 is executed to increment the 4th clutch energy indication by the fixed amount K1.

Referring now to the Energy Reduction Routine mentioned above in reference to block 352 of the main flow diagram of FIG. 4, the instruction blocks 440-442 are executed to look up an energy reduction factor (ERF) and to decrement the 3rd and 4th clutch cumulative energy indications C3 ENERGY(OLD) and C4 ENERGY(OLD) by the amount ERF. As described above in reference to FIG. 3, the Energy Reduction Factor is determined as an inverse function of the sum of the turbine speed Nt and the engine throttle position TPS. This relationship may be stored as a look-up table or similar data structure within control unit 270.

Finally, referring to the Offset Calculation mentioned above in reference to block 354 of the main flow diagram of FIG. 4, the instruction blocks 450-454 are executed to square and sum the cumulative energy terms C3 ENERGY(OLD) and C4 ENERGY(OLD) to form a cumulative term ENERGY, to determine the amount, if any, by which the cumulative term exceeds the energy threshold K1, and to form a throttle position offset TPShys by applying a gain term G4 to the difference. In subsequent executions of the main program of FIG. 4, the block 336 will determine the desirability of a 2-3 or a 3-4 upshift based on the sum (TPS+TPShys), as described above in reference to the graphs of FIG. 2.

As indicated above, the second embodiment of this invention differs from the above-described first embodiment in that the cumulative energy indications for the 3rd and 4th clutches 32 and 34, and the corresponding offsets, if any, are separately maintained. This difference is highlighted by the additional blocks 460-466 in the flow diagram of FIGS. 4a, and by the blocks 470-476 in the flow diagram of FIG. 9a. In all other respects, the flow diagrams of FIGS. 4a and 9a correspond to the above described flow diagrams of FIGS. 4 and 9, respectively.

Referring to FIG. 4a, the decision block 460 is executed to determine if the transmission is in 2nd gear. If so, the block 336 must consider the desirability of a 2-3 upshift, and the instruction block 462 is executed to set the offset term TPShys equal to the correct value for the 3rd clutch 32. If the transmission is in 3rd gear, as determined by decision block 464, the block 336 must consider the desirability of a 3-4 upshift, and the instruction block 466 is executed to set the offset term TPShys equal to the correct value for the 4th clutch 34.

The offset values for the 3rd and 4th clutches 32 and 34 are determined by the Offset Calculation routine referenced in block 354 of FIG. 4a, and detailed in the flow diagram of FIG. 9a. Referring to FIG. 9a, the blocks 470-472 are first executed to individually square the cumulative energy terms C3 ENERGY(OLD) and C4 ENERGY(OLD), compare them to the energy threshold K1, and multiply the difference, if any, by the gain factors K2 or K3. If the offset value TPS3hys for the 3rd clutch 32 is greater than the offset value TPS4hys for the 4th clutch 34, as determined by the decision block 474, the instruction block 476 is executed to set the TPS4hys equal to TPS3hys. Otherwise, the routine is exited and the offset values TPS3hys and TPS4hys are maintained separate, as in the example depicted in FIG. 2a.

While this invention has been described in reference to the illustrated embodiments, it is expected that various modifications will occur to those skilled in the art, and it should be understood that methods of operation incorporating such modifications may fall within the scope of this invention which is defined by the appended claims.

The embodiments of the invention in which an exclusive property or privilege is claimed are defined as follows:

1. In a motor vehicle having an engine connected to drive the vehicle through a transmission, the transmission having at least two engageable torque transmitting devices, wherein said devices are engaged and disengaged according to a predefined pattern to establish an upper or a lower speed ratio between input and output shafts of said transmission, and wherein upshifting from said lower speed ratio to said upper speed ratio and downshifting from said upper speed ratio to said lower speed ratio is initiated when a comparison of measured load condition parameters with predetermined load condition parameters indicates that such upshifting or downshifting is desired, a method of operation comprising the steps of:
   developing a net measure of thermal energy absorbed and dissipated by the torque transmitting devices in the course of shifting and nonshifting modes of operation;
   computing an offset amount in relation to the amount by which said net measure of thermal energy exceeds a threshold level indicative of excessive thermal energy; and
   modifying said measured load condition parameters when said net measure exceeds said threshold level so as to delay upshifting from said lower speed ratio to said upper speed ratio until said measured load condition parameters exceed said predetermined load condition parameters by said offset amount, thereby to extend the establishment of said lower speed ratio until the excessive thermal energy is dissipated.

2. The method of operation set forth in claim 1, wherein the step of developing a net measure of thermal energy includes the steps of:
   at the time of upshifting and downshifting, computing a measure of incremental thermal energy absorbed by the torque transmitting devices due to said upshift and downshift;
   summing each such measure of incremental thermal energy to form a cumulative indication of thermal energy absorbed by said torque transmitting devices due to upshifting and downshifting; and
   periodically decrementing said cumulative indication of thermal energy by an amount reflects the dissipation of thermal energy by said torque transmitting devices, to thereby form said net measure of thermal energy.

3. The method of operation set forth in claim 2, wherein said engine includes a throttle positioned to control engine power output, and said amount which reflects the dissipation of thermal energy by said torque transmitting devices is determined as a combined function of the engine throttle position and the speed of said transmission input shaft.

4. The method of operation set forth in claim 1, wherein said engine includes a throttle positioned to control engine power output, wherein said measured load condition parameters include engine throttle position and vehicle speed; and the step of modifying said measured load condition parameters includes the step of increasing said measured engine throttle position by said offset amount.

5. In a motor vehicle having an engine connected to drive the vehicle through a transmission, the transmission having lower, middle and upper torque transmitting devices engageable to establish lower, middle or upper speed ratios, respectively, between input and output shafts of said transmission, and wherein upshifting and downshifting among said speed ratios is initiated when a comparison of measured load condition parameters with predetermined load condition parameters indicates that such upshifting or downshifting is desired, a method of operation comprising the steps of:

developing net measures of thermal energy absorbed and dissipated by said middle and upper torque transmitting devices in the course of shifting and nonshifting modes of operation;

computing an offset amount in relation to the amount by which a sum of said net measures of thermal energy exceeds a threshold level indicative of excessive thermal energy; and modifying said measured load condition parameters when said sum of net measures exceeds said threshold level so as to delay upshifting to said middle and upper speed ratios until said measured load condition parameters exceed said predetermined load condition parameters by said offset amount, thereby to extend the establishment of said lower and middle speed ratios until the excessive thermal energy is dissipated.

6. The method of operation set forth in claim 5, wherein the step of developing net measures of thermal energy includes the steps of:

at the time of upshifting and downshifting, computing a measure of incremental thermal energy absorbed by the middle and upper torque transmitting devices due to said upshift and downshift;

summing said measures of incremental thermal energy for each of the middle and upper torque transmitting devices to form cumulative indications of thermal energy absorbed by said middle and upper torque transmitting devices due to upshifting and downshifting; and periodically decrementing said cumulative indications of thermal energy by an amount reflects the dissipation of thermal energy by said middle and upper torque transmitting devices, to thereby form said net measures of thermal energy.

7. The method of operation set forth in claim 6, wherein said engine includes a throttle positioned to control engine power output, and said amount which reflects the dissipation of thermal energy by said middle and upper torque transmitting devices is determined as a combined function of the engine throttle position and the speed of said transmission input shaft.

8. The method of operation set forth in claim 5, wherein said engine includes a throttle positioned to control engine power output, wherein said measured load condition parameters include engine throttle position and vehicle speed; and the step of modifying said measured load condition parameters includes the step of increasing said measured engine throttle position by said offset amount.

9. In a motor vehicle having an engine connected to drive the vehicle through a transmission, the transmission having lower, middle and upper torque transmitting devices engageable to establish lower, middle or upper speed ratios, respectively, between input and output shafts of said transmission, and wherein upshifting and downshifting among said speed ratios is initiated when a comparison of measured load condition parameters with predetermined load condition parameters indicates that such upshifting or downshifting is desired, a method of operation comprising the steps of:

developing middle and upper net measures of thermal energy absorbed and dissipated by said middle and upper torque transmitting devices in the course of shifting and nonshifting modes of operation;

computing an offset amount for said middle torque transmitting device in relation to the amount by which said middle net measure of thermal energy exceeds a threshold level indicative of excessive thermal energy;

computing an offset amount for said upper torque transmitting device in relation to the amount by which said upper net measure of thermal energy exceeds said threshold level;

modifying said measured load condition parameters when said lower torque transmitting device is engaged so as to delay upshifting to said middle speed ratio until said measured load condition parameters exceed said predetermined load condition parameters by the offset amount for said middle torque transmitting device; and modifying said measured load condition parameters when said middle torque transmitting device is engaged so as to delay upshifting to said upper speed ratio until said measured load condition parameters exceed said predetermined load condition parameters by greater of the offset amounts for said middle and upper torque transmitting devices.

10. The method of operation set forth in claim 9, wherein said engine includes a throttle positioned to control engine power output, wherein said measured load condition parameters include engine throttle position and vehicle speed;

the step of modifying said measured load condition parameters when said lower torque transmitting device is engaged includes the step of increasing said measured engine throttle position by said middle offset amount; and the step of modifying said measured load condition parameters when said middle torque transmitting device is engaged includes the step of increasing said measured engine throttle position by said upper offset amount.

11. In a motor vehicle having an engine connected to drive the vehicle through a transmission, the transmission having upper and lower torque transmitting devices engageable to establish upper or lower speed ratios between input and output shafts of said transmission, wherein upshifting from said lower speed ratio to said upper speed ratio and downshifting from said upper speed ratio to said lower speed ratio is initiated in response to a comparison of measured load condition parameters with predetermined upshift and downshift load condition parameters for each speed ratio, the predetermined upshift and downshift load condition parameters for each speed ratio providing hysteresis between upshifting to and downshifting from such speed ratio, a method of operation comprising the steps of:

developing a net measure of thermal energy absorbed and dissipated by the torque transmitting devices in the course of shifting and nonshifting modes of operation;

computing an offset amount in relation to the amount by which said net measure of thermal energy energy; and modifying said measured load condition parameters when said net measure exceeds said threshold level so as to delay upshifting from said lower speed ratio to said upper speed ratio until said measured load condition parameters exceed said predetermined upshift load condition parameters by said offset amount, thereby to increase the hysteresis between upshifting to and downshifting from said upper speed ratio until the excessive thermal energy is dissipated.

* * * * *